United States Patent
Yang

(10) Patent No.: US 7,285,001 B2
(45) Date of Patent: Oct. 23, 2007

(54) TENSION-EXERTED HOOP FOR PLASTIC AND RUBBER ARTICLES

(75) Inventor: Li Ling Yang, Changhua (TW)

(73) Assignee: Der-Zhan Traffic Material Co., Ltd., Changhua (TW)

( * ) Notice: Subject to any disclaimer, the term of this patent is extended or adjusted under 35 U.S.C. 154(b) by 0 days.

(21) Appl. No.: 11/315,498

(22) Filed: Dec. 23, 2005

(65) Prior Publication Data
US 2007/0144651 A1    Jun. 28, 2007

(51) Int. Cl.
*H01R 13/52* (2006.01)
(52) U.S. Cl. .......................... 439/271; 439/587
(58) Field of Classification Search ........ 439/271–276, 439/587
See application file for complete search history.

(56) References Cited

U.S. PATENT DOCUMENTS

| | | | | |
|---|---|---|---|---|
| 4,611,656 | A * | 9/1986 | Kendall et al. | 166/65.1 |
| 4,854,501 | A * | 8/1989 | Ricci | 239/54 |
| 5,344,315 | A * | 9/1994 | Hanson | 433/20 |
| 5,590,497 | A * | 1/1997 | Moore | 52/223.3 |
| 6,944,899 | B2 * | 9/2005 | Gladney | 5/716 |
| 2004/0158930 | A1 * | 8/2004 | Gladney | 5/716 |

* cited by examiner

*Primary Examiner*—James R. Harvey
(74) *Attorney, Agent, or Firm*—Troxell Law Office, PLLC

(57) ABSTRACT

A tension-exerted hoop for plastic and rubber articles comprises a tension-exerted (lock) hoop made up of a plurality of flexible wires wound into a hoop-shaped configuration wherein the flexible wires are respectively twined and bundled up via multiple thin filaments into identical-diameter wires each having a combining coarse surface defined by protruded and recessed sections at the outer periphery thereon. Therefore, when the tension-exerted hoop are housed inside plastic or rubber material of an air-filled container, the plastic or rubber material can penetrate into fissures formed among the thin filaments and securely bind with the coarse surfaces to create double layers of penetrative binding engagement thereby, increasing the binding area between the plastic or rubber material and the tension-exerted (lock) hoop so as to prevent the tension-exerted (lock) hoop from collapse and detachment during the repeated inflation and deflation operation of the air-filled plastic or rubber container thereof.

1 Claim, 6 Drawing Sheets

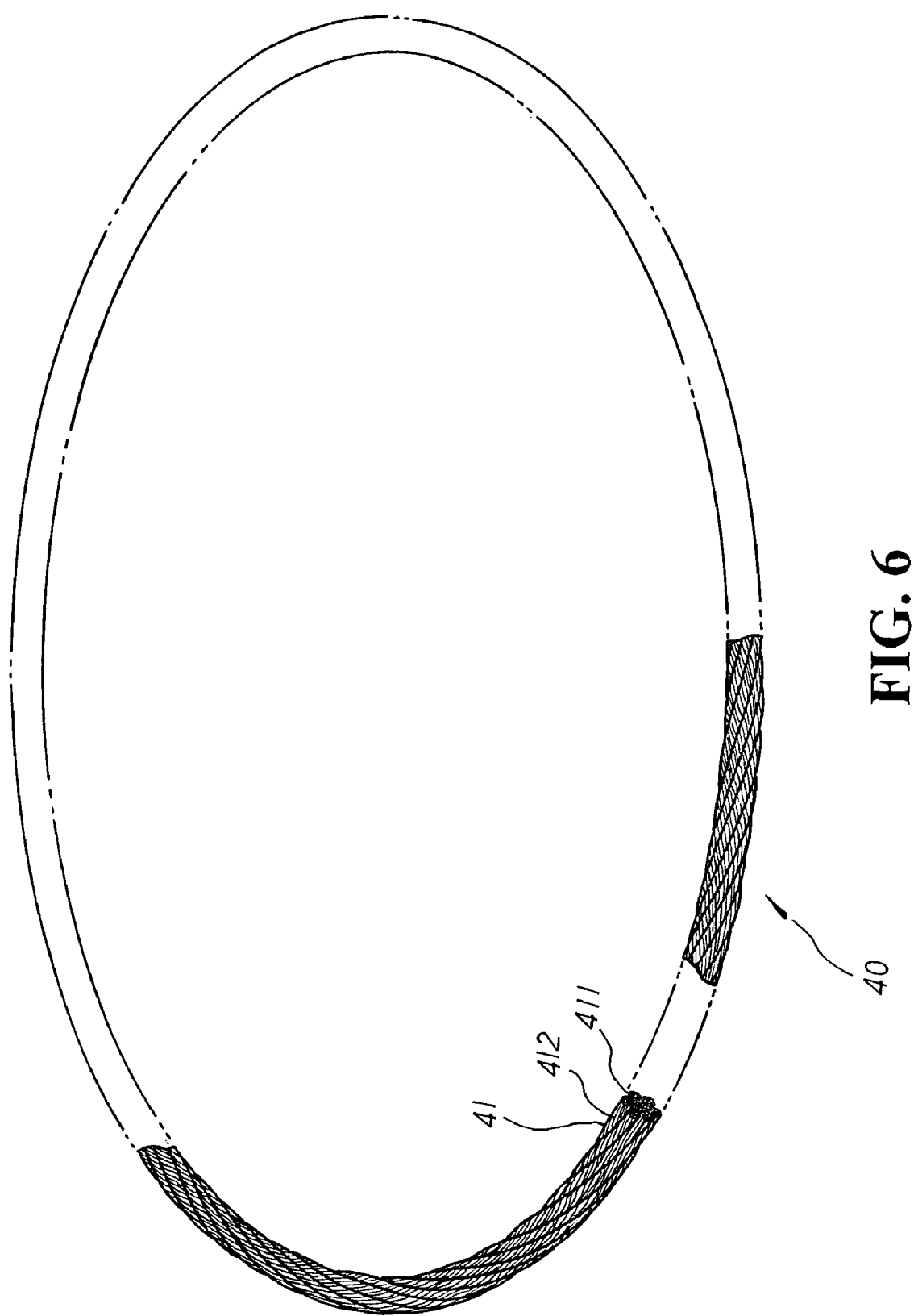

TENSION-EXERTED HOOP FOR PLASTIC AND RUBBER ARTICLES

BACKGROUND OF THE INVENTION

The present invention is related to a tension-exerted hoop for plastic and rubber articles, comprising a tension-exerted (lock) hoop made up of a plurality of flexible wires wound into a hoop-shaped configuration wherein the flexible wires are respectively twined and bundled up via multiple thin filaments into identical-diameter wires each having a combining coarse surface defined by protruded and recessed sections thereon so that plastic or rubber material of an air-filled container can penetrate into fissures formed among the thin filaments thereof and securely bind with the combining coarse surfaces of the flexible wires to create double-layer binding engagement thereby, increasing the binding area between the plastic or rubber material and the tension-exerted (lock) hoop so as to prevent the tension-exerted (lock) hoop from detachment during the repeated inflation and deflation operation of the air-filled plastic or rubber container thereof.

Please refer to FIG. 1. A conventional tension-exerted hoop for plastic and rubber articles includes a tension-exerted (lock) hoop 10 that can be housed to the interior of a shock-resistant air bag 21 of a vehicle 20 as shown in FIGS. 2, 3, or a coupling ring 31 of a tire 30 as shown in FIG. 4. The tension-exerted (lock) hoop 10 is made up of a plurality of smooth-surface and identical-diameter flexible wires 11 that are wound into a hoop-shaped configuration and are bound by plastic or rubber material 211, 311 of an air-filled container like the anti-shock air bag 21 or the tire 30 as shown in FIG. 5.

There are some disadvantages to such conventional tension-exerted (lock) hoop. Most of all, the tension-exerted (lock) hoop 10 is directly twined and made by multiple smooth-surface and identical-diameter flexible wires 11, and the plastic or rubber material 211, 311 of the air-filled container like the anti-shock air bag 21, or the tire 30 thereof can simply coat to the fissures formed among the flexible wires 11 and wrap around the outer surface of each flexible wire thereof. During the process of repeated inflation and deflation of the air-filled container, the plastic or rubber material 211, 311 without secure binding engagement thereof tends to get peeled off from the tension-exerted (lock) hoop 10. Thus, the tension-exerted (lock) hoop 10 can easily get loosened and fail to be stably located in the operation thereof.

SUMMARY OF THE PRESENT INVENTION

It is, therefore, the primary purpose of the present invention to provide a tension exerted hoop for plastic and rubber articles, comprising a tension-exerted (lock) hoop made up of a plurality of flexible wires wound into a hoop-shaped configuration wherein the flexible wires are respectively twined and bundled up via multiple thin filaments into identical-diameter wires each having a combining coarse surface defined by protruded and recessed sections at the outer periphery thereon so that plastic or rubber material of an air-filled container can penetrate into fissures formed among the thin filaments and securely bind with the coarse surfaces of the flexible wires to create double layers of penetrative binding engagement thereby, increasing the binding area between the plastic or rubber material and the tension-exerted (locked) hoop so as to prevent the tension-exerted (lock) hoop from collapse and detachment during the repeated inflation and deflation operation of the air-filled container, achieving the best state of application thereby.

BRIEF DESCRIPTION OF THE DRAWINGS

FIG. 6 is a perspective view of the present invention.

DETAILED DESCRIPTION OF THE PREFERRED EMBODIMENTS

Figure 1:
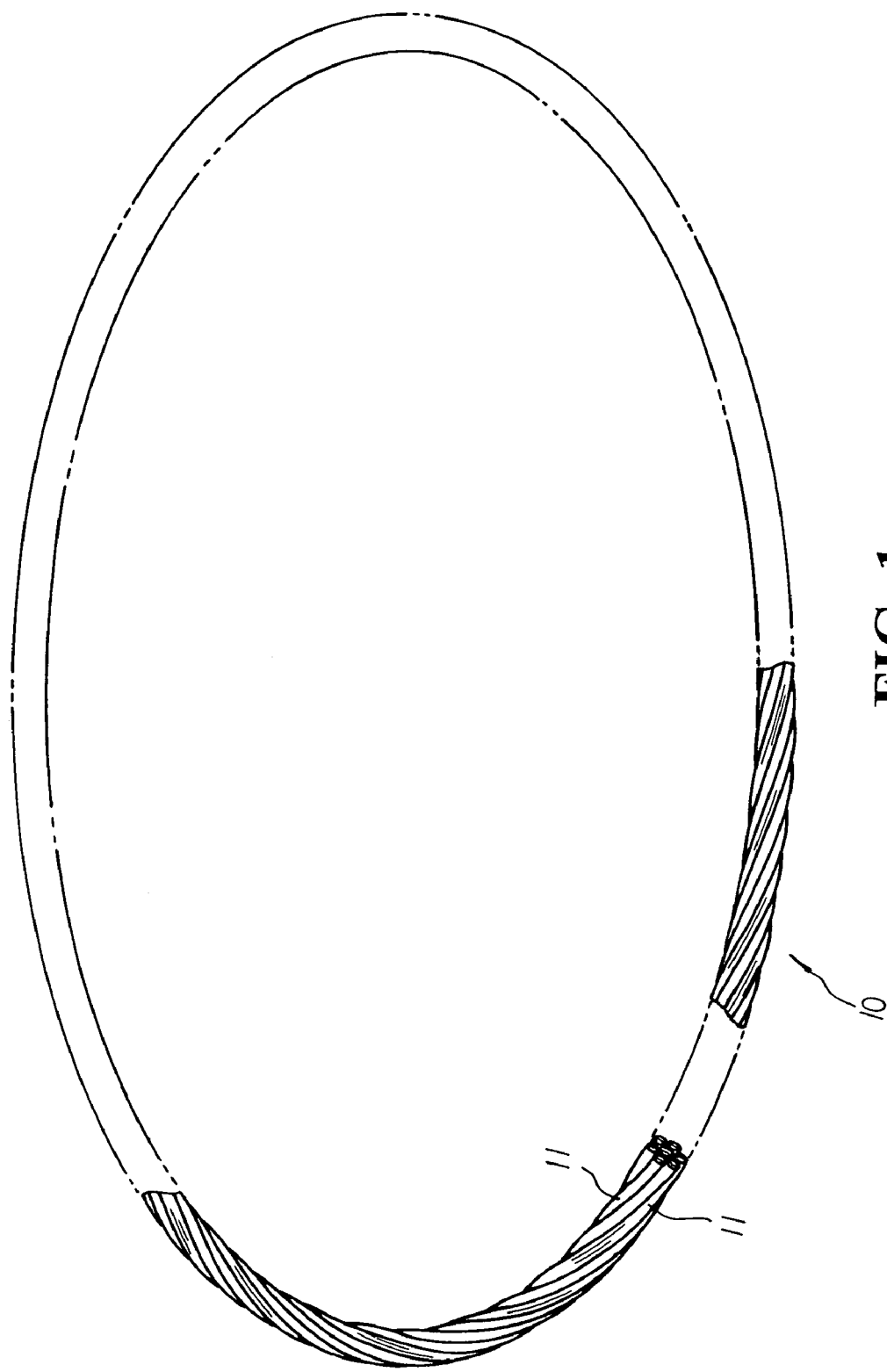
FIG. 1 is a perspective view of a conventional tension-exerted hoop.
Figure 2:
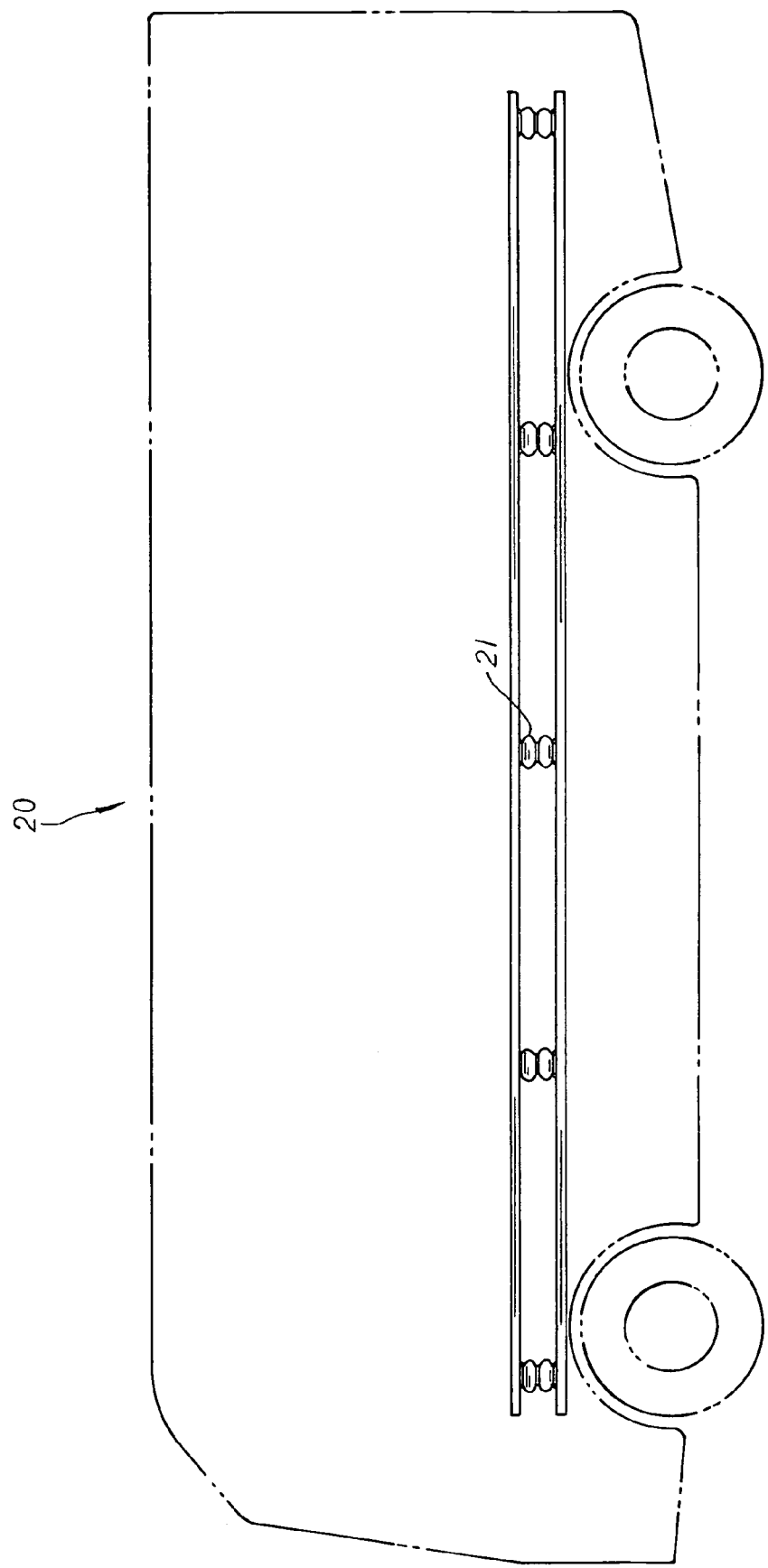
FIG. 2 is a diagram showing the conventional tension-exerted hoop housed inside an air-filled plastic or rubber container (like a shock-resistant air bag) of a vehicle.
Figure 3:
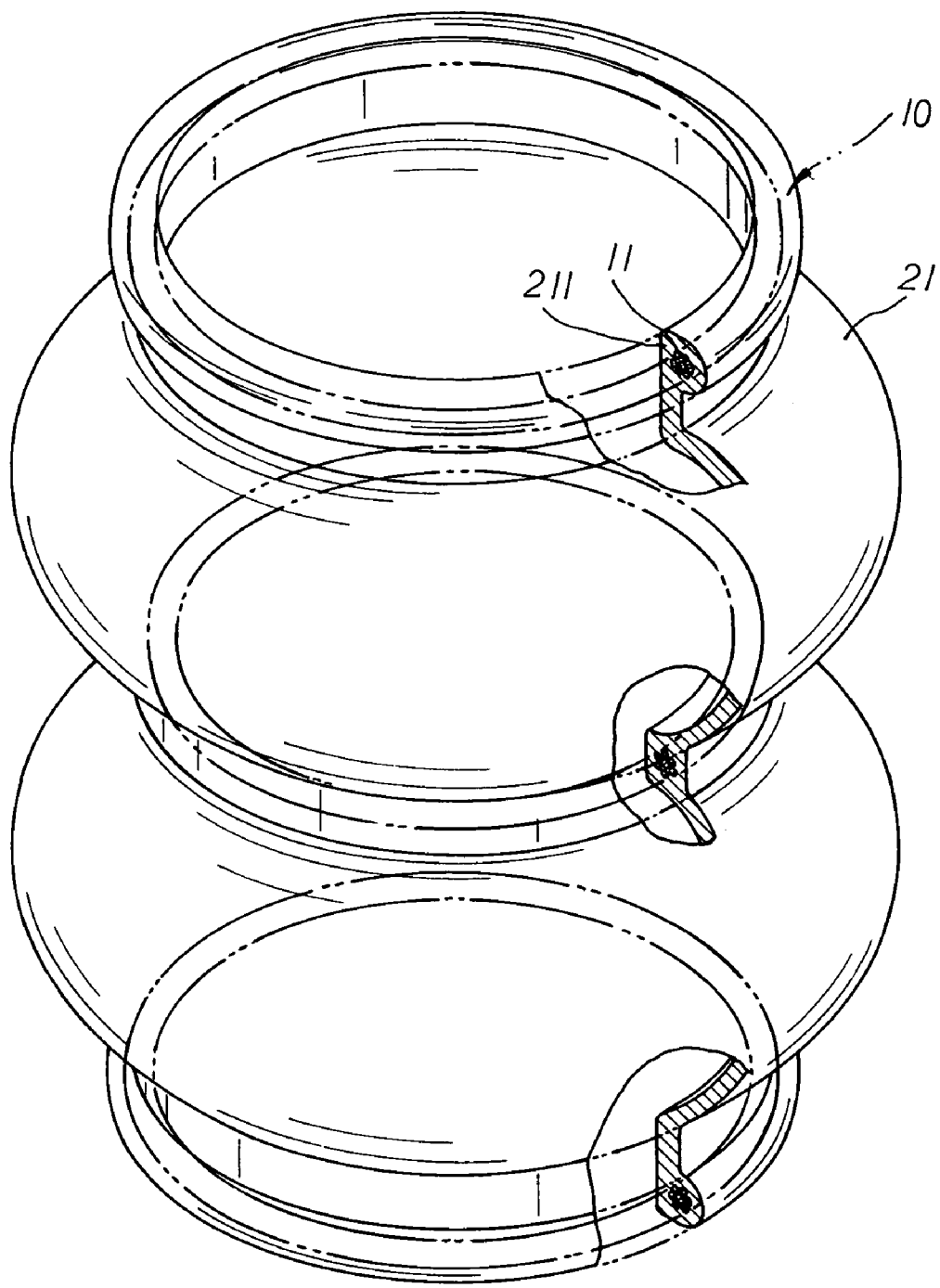
FIG. 3 is an assembled perspective view of the conventional tension-exerted hoop housed inside the air-filled plastic or rubber container (like a shock-resistant air bag) of a vehicle.
Figure 4:
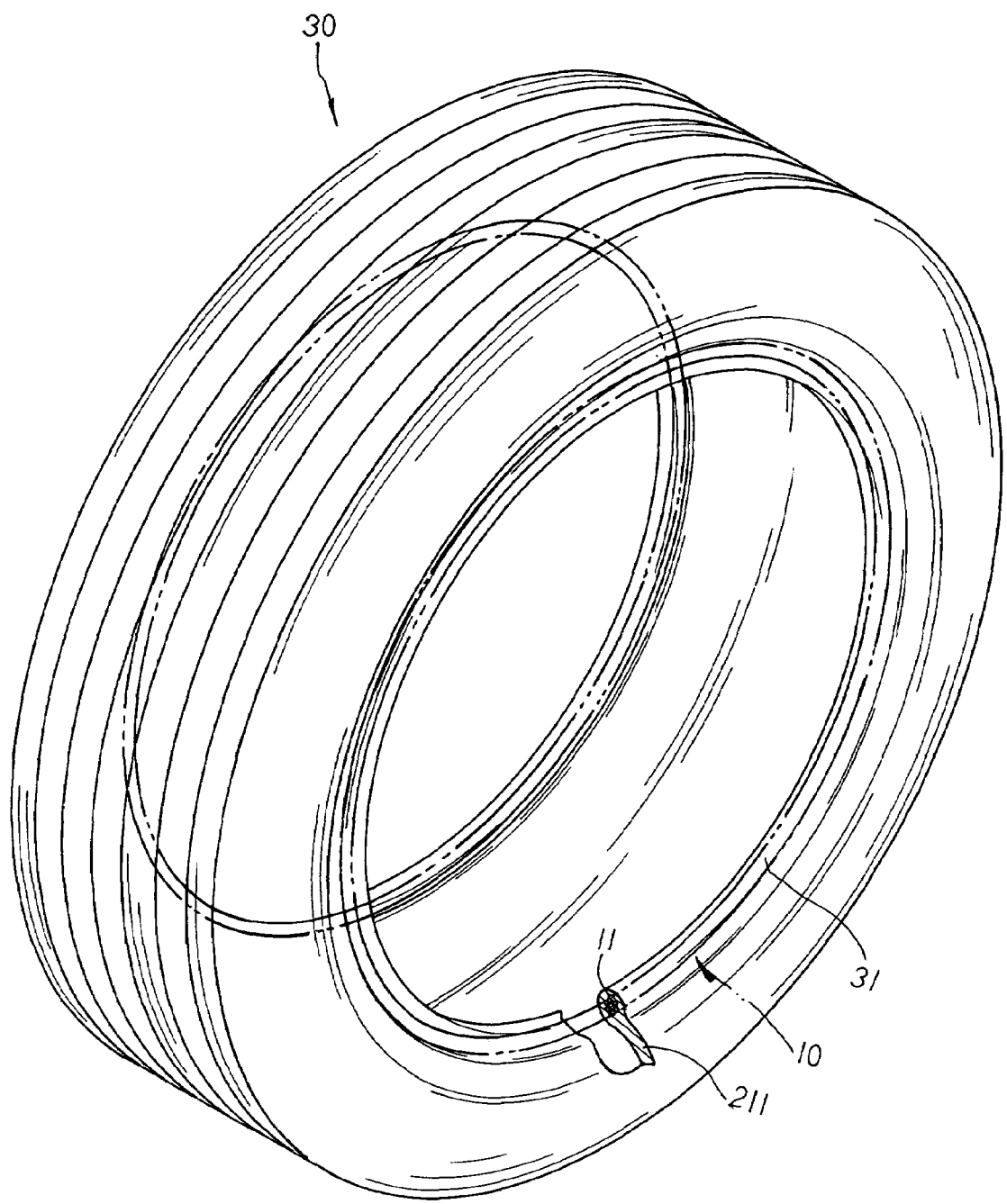
FIG. 4 is an assembled perspective view of the conventional tension-exerted hoop housed inside an air-filled plastic or rubber container (like a tire).
Figure 7:
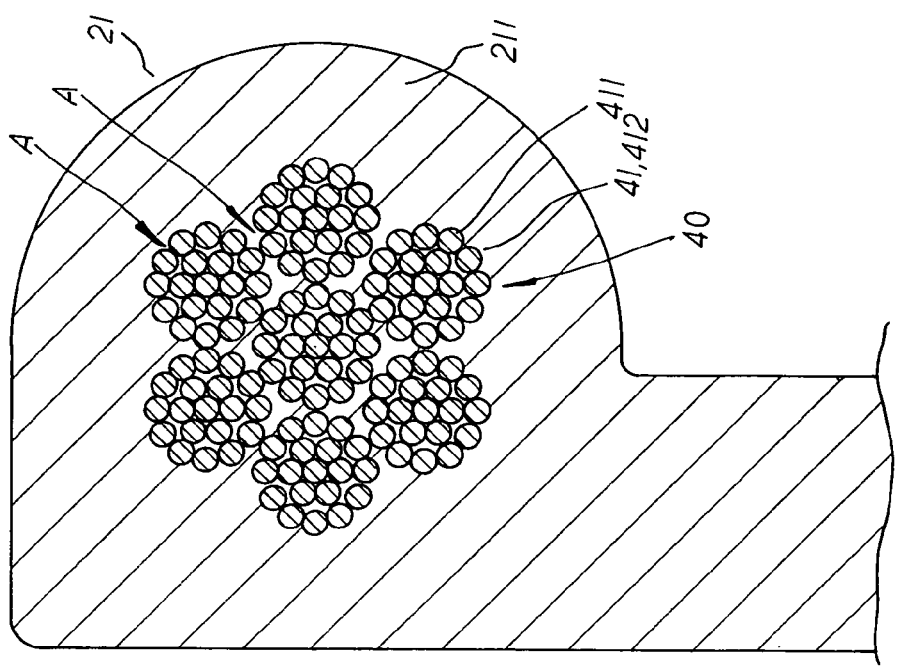
FIG. 7 is an assembled and partially enlarged view of the present invention housed inside an air-filled plastic or rubber container (like a shock-resistant air bag).
Figure 5:
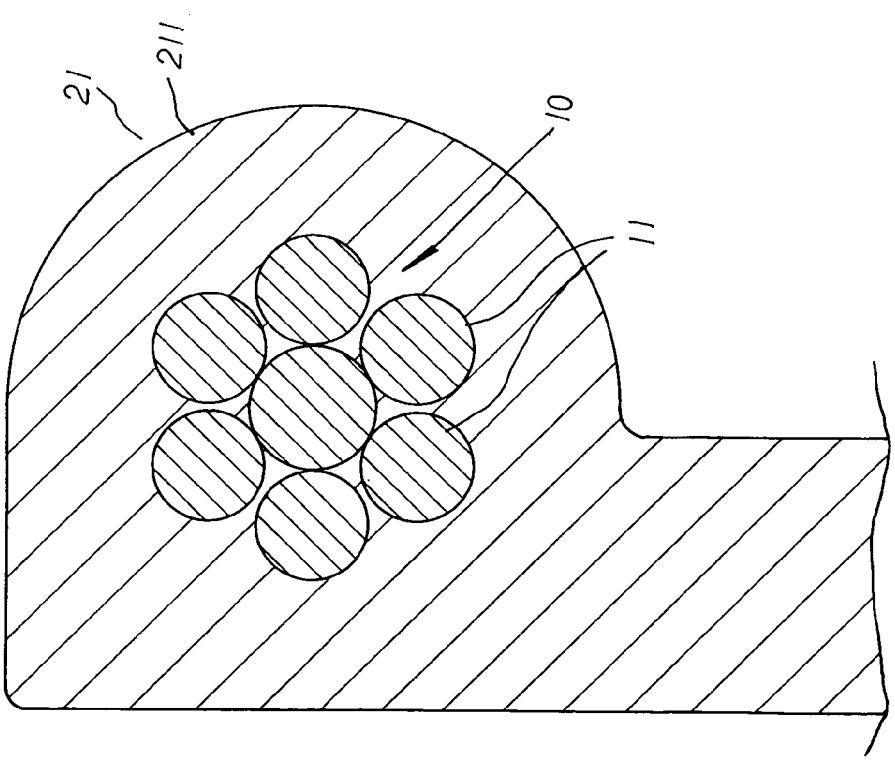
FIG. 5 is an assembled and partially enlarged view of the conventional tension-exerted hoop housed inside the air-filled plastic or rubber container (like a tire).

Please refer to FIG. 6 showing a perspective view of the present invention. The present invention is related to a tension-exerted hoop for plastic and rubber articles, comprising a tension-exerted (lock) hoop 40 made up of a plurality of flexible wires 41 wound into a hoop-shaped configuration wherein the flexible wires 41 are respectively twined and bundled up via multiple thin filaments 411 into identical-diameter wires each having a combining coarse surface 412 defined by protruded and recessed sections at the outer periphery thereon. The tension-exerted (lock) hoop 40 can be housed inside plastic or rubber material 211 of an air-filled container like a shock-resistant air bag 21 of a vehicle as shown in FIG. 7 or a coupling ring of a tire, permitting the plastic or rubber material 211 to penetrate into fissures A formed among the thin filaments 412 of each flexible wire 41 as shown in FIG. 7 and securely bind with the combining coarse surface 412 thereof. Therefore, via the tension-exerted (lock) hoop 40 made up of the flexible wires 41 each bundled by the thin filaments 411 and defined by the coarse surface 412 thereon, the plastic or rubber material 211 of the air-filled container like the shock-resistant air bag 21 can penetrate into the fissures A of the flexible wires 41 and wrap around the thin filaments 411 to create a first layer of penetrative binding engagement therewith. Besides, the plastic or rubber material 211 is precisely coated at the outer periphery of each flexible wire 41 and bound with the combining coarse surface 412 to create a second layer of penetrative binding engagement thereby so as to increase the binding area between the plastic or rubber material 211 and the tension-exerted (lock) hoop 40 thereof. Thus, the tension-exerted (lock) hoop 40 can be stably located to avoid the risk of collapse and detachment during the repeated inflation and deflation operation of the air-filled plastic or rubber container, achieving the best state of application thereby.

What is claimed is:

1. A tension-exerted hoop for articles made of an article material selected from a group consisting of plastic and rubber, the tension-exerted hoop comprising:

a plurality of flexible wires having an equal outer diameter and being twined and bundled into a hoop-shaped configuration, each of the plurality of flexible wires having:
a) a plurality of thin filaments twined and bundled together;
b) a course outer surface being formed by exposed portions of exterior surfaces of the plurality of thin filaments; and
c) a plurality of fissures formed in the course outer surface by the exposed portions of the exterior surfaces of the plurality of thin filaments, wherein the article material covering the plurality of flexible wires and being located in the plurality of fissures of the plurality of flexible wires.

* * * * *